US012805580B2

(12) United States Patent

Al-Amin et al.

(10) Patent No.: US 12,805,580 B2
(45) Date of Patent: Nov. 24, 2026

(54) CHARGING DEVICE

(71) Applicant: NICOVENTURES TRADING LIMITED, London (GB)

(72) Inventors: Mohammed Al-Amin, London (GB); Damyn Musgrave, London (GB)

(73) Assignee: NICOVENTURES TRADING LIMITED, London (GB)

(*) Notice: Subject to any disclaimer, the term of this patent is extended or adjusted under 35 U.S.C. 154(b) by 11 days.

(21) Appl. No.: 18/717,662

(22) PCT Filed: Dec. 8, 2022

(86) PCT No.: PCT/GB2022/053133
§ 371 (c)(1),
(2) Date: Jun. 7, 2024

(87) PCT Pub. No.: WO2023/105232
PCT Pub. Date: Jun. 15, 2023

(65) Prior Publication Data

US 2025/0040622 A1 Feb. 6, 2025

(30) Foreign Application Priority Data

Dec. 9, 2021 (GB) ..................................... 2117815

(51) Int. Cl.
*A24F 40/90* (2020.01)
*H02J 7/70* (2026.01)
(Continued)

(52) U.S. Cl.
CPC .............. *A24F 40/90* (2020.01); *H02J 7/731* (2026.01); *H02J 50/10* (2016.02); *H02J 50/20* (2016.02); *H02J 50/402* (2020.01); *H02J 50/90* (2016.02)

(58) Field of Classification Search
CPC ........ A24F 40/90; A24F 40/95; H02J 7/0044; H02J 50/10; H02J 50/20; H02J 50/402;
(Continued)

(56) References Cited

U.S. PATENT DOCUMENTS 8,541,974 B2 * 9/2013 Farahani ................. H02J 50/80 320/108
11,000,067 B1 5/2021 Bajpai et al.
(Continued)

FOREIGN PATENT DOCUMENTS

CN 207490578 U * 6/2018
CN 211046572 U * 7/2020
(Continued)

OTHER PUBLICATIONS

International Search Report and Written Opinion issued in corresponding International Application No. PCT/GB2022/053133 mailed Feb. 28, 2023, all pages.
(Continued)

*Primary Examiner* — Pinping Sun
(74) *Attorney, Agent, or Firm* — Burr & Forman

(57) ABSTRACT

A charging device is described comprising: a cup-shaped body or cradle configured to receive an aerosol provision device; and at least one radio frequency transmitter configured to broadcast radio frequency signals into an internal aperture of the cup-shaped body or cradle.

9 Claims, 7 Drawing Sheets

(51) Int. Cl.
*H02J 50/10* (2016.01)
*H02J 50/20* (2016.01)
*H02J 50/40* (2016.01)
*H02J 50/90* (2016.01)

(58) Field of Classification Search
CPC ...... H02J 50/90; H02J 7/0042; H02J 7/00032; H02J 50/80
See application file for complete search history.

(56) References Cited

U.S. PATENT DOCUMENTS

| | | | | |
|---|---|---|---|---|
| 2010/0289341 | A1* | 11/2010 | Ozaki | H02J 50/12 307/104 |
| 2012/0298105 | A1 | 11/2012 | Osorio | |
| 2013/0241474 | A1* | 9/2013 | Moshfeghi | H02J 7/00036 320/108 |
| 2014/0224267 | A1* | 8/2014 | Levitz | A24F 40/40 320/108 |
| 2014/0292100 | A1* | 10/2014 | Lee | H04B 5/79 307/104 |
| 2015/0171658 | A1* | 6/2015 | Manova-Elssibony | H04B 7/12 320/108 |
| 2015/0250961 | A1 | 9/2015 | Whitman et al. | |
| 2017/0112196 | A1 | 4/2017 | Sur et al. | |
| 2017/0181223 | A1 | 6/2017 | Sur et al. | |
| 2017/0202266 | A1 | 7/2017 | Sur | |
| 2017/0373539 | A1* | 12/2017 | Von Novak, III | H02J 50/502 |
| 2018/0007968 | A1 | 1/2018 | Sur | |
| 2018/0070632 | A1 | 3/2018 | Sur et al. | |
| 2018/0070634 | A1 | 3/2018 | Sur et al. | |
| 2018/0132531 | A1 | 5/2018 | Sur et al. | |
| 2018/0140013 | A1 | 5/2018 | Sur et al. | |
| 2018/0213844 | A1 | 8/2018 | Sur et al. | |
| 2018/0338527 | A1 | 11/2018 | Sur | |
| 2019/0014819 | A1 | 1/2019 | Sur | |
| 2019/0014823 | A1 | 1/2019 | Sur | |
| 2019/0082736 | A1 | 3/2019 | Sur | |
| 2019/0089180 | A1 | 3/2019 | Sur | |
| 2019/0116863 | A1 | 4/2019 | Dull | |
| 2019/0124979 | A1 | 5/2019 | Sebastian et al. | |
| 2019/0174823 | A1 | 6/2019 | Sur | |
| 2019/0261685 | A1 | 8/2019 | Wilberding et al. | |
| 2019/0274353 | A1 | 9/2019 | Sur | |
| 2019/0274354 | A1 | 9/2019 | Sur et al. | |
| 2019/0281892 | A1 | 9/2019 | Hejazi et al. | |
| 2019/0289908 | A1 | 9/2019 | Worm et al. | |
| 2019/0289909 | A1 | 9/2019 | Hejazi | |
| 2019/0343179 | A1 | 11/2019 | Sur | |
| 2019/0350256 | A1 | 11/2019 | Hejazi | |
| 2019/0350257 | A1 | 11/2019 | Sur | |
| 2019/0363565 | A1* | 11/2019 | Graham | H01F 27/2871 |
| 2019/0387787 | A1 | 12/2019 | Hejazi | |
| 2020/0046021 | A1 | 2/2020 | Sur | |
| 2020/0060340 | A1 | 2/2020 | Hejazi et al. | |
| 2020/0060341 | A1 | 2/2020 | Sebastian et al. | |
| 2020/0077703 | A1 | 3/2020 | Monsalud, Jr. et al. | |
| 2020/0093182 | A1 | 3/2020 | Monsalud et al. | |
| 2020/0128880 | A1 | 4/2020 | Gage et al. | |
| 2020/0154779 | A1 | 5/2020 | Novak, III et al. | |
| 2020/0154784 | A1 | 5/2020 | Sebastian et al. | |
| 2020/0154785 | A1 | 5/2020 | Sebastian et al. | |
| 2020/0163389 | A1 | 5/2020 | Sur | |
| 2020/0236993 | A1 | 7/2020 | Sur | |
| 2020/0237018 | A1 | 7/2020 | Sur | |
| 2020/0245696 | A1 | 8/2020 | Sur | |
| 2020/0253287 | A1 | 8/2020 | Sur | |
| 2020/0278707 | A1 | 9/2020 | Sur | |
| 2020/0281249 | A1 | 9/2020 | Sebastian et al. | |
| 2020/0281250 | A1 | 9/2020 | Dull et al. | |
| 2020/0286312 | A1* | 9/2020 | Wilson | H04M 1/72412 |
| 2020/0315259 | A1 | 10/2020 | Hubbard et al. | |
| 2020/0337382 | A1 | 10/2020 | Sur | |
| 2020/0367553 | A1 | 11/2020 | Hejazi | |
| 2020/0367572 | A1 | 11/2020 | Hejazi et al. | |
| 2021/0052009 | A1* | 2/2021 | Slama | A24F 40/90 |
| 2021/0052014 | A1 | 2/2021 | Hejazi | |
| 2021/0059301 | A1 | 3/2021 | Hejazi | |
| 2021/0084970 | A1 | 3/2021 | Hejazi et al. | |
| 2021/0100291 | A1 | 4/2021 | Sur | |
| 2021/0112881 | A1 | 4/2021 | Hejazi | |
| 2021/0112882 | A1 | 4/2021 | Hejazi et al. | |
| 2021/0127455 | A1 | 4/2021 | Sur | |
| 2021/0177046 | A1 | 6/2021 | Sebastian | |
| 2021/0273467 | A1 | 9/2021 | Williams et al. | |
| 2022/0021247 | A1* | 1/2022 | Partovi | H01F 7/0252 |
| 2023/0364525 | A1* | 11/2023 | Kauffmann | A63H 33/009 |

FOREIGN PATENT DOCUMENTS

| | | | | |
|---|---|---|---|---|
| DE | 102015105610 | B3 * | 3/2018 | H01Q 1/38 |
| JP | 2013514748 | A | 4/2013 | |
| JP | 2015521459 | A | 7/2015 | |
| JP | 2016530864 | A | 9/2016 | |
| JP | 2019525747 | A | 9/2019 | |
| JP | 2021521808 | A | 5/2023 | |
| KR | 20210006209 | A * | 1/2021 | |
| KR | 1020210006209 | A | 1/2021 | |
| WO | 2021074820 | A1 | 4/2021 | |

OTHER PUBLICATIONS

Search Report issued in corresponding UK Patent Application No. GB2117815.7 mailed Aug. 17, 2022, all pages.
Notice of Reasons for Refusal from corresponding Japanese Application No. 2024-529951, mailed Jun. 17, 2025, all pages.

* cited by examiner

CHARGING DEVICE

TECHNICAL FIELD

The present specification relates to a charging device, for example for charging a battery of an aerosol provision device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol provision substrate such as tobacco to form an aerosol by heating, but not burning, the substrate. There remains a need for further developments in this field.

SUMMARY

In a first aspect, this specification describes a charging device comprising: a cup-shaped body or cradle configured to receive an aerosol provision device; and at least one radio frequency transmitter configured to broadcast radio frequency signals into an internal aperture of the cup-shaped body or cradle.

A lining of an internal aperture of the cup-shaped body or cradle may comprise a material that reflects radio frequency signals.

A/the lining of an internal aperture of the cup-shaped body or cradle may comprise a material that reflects selected radio frequency signals.

In some example embodiments, at least one radio transmitter is positioned in a base of the cup-shaped body or cradle. Alternatively, or in addition, at least one radio transmitter is positioned in a wall of the cup-shaped body or cradle along its longitudinal axis.

The at least one radio frequency transmitter may comprise a plurality of radio frequency transmitters. For example, the plurality of radio frequency transmitters may be arranged at different points in a/the wall along the longitudinal axis of the cup-shaped body or cradle. Alternatively, or in addition, the plurality of radio frequency transmitters may be arranged at different angular positions in a/the wall of the cup-shaped body or cradle.

The charging device may further comprise an induction charger, configured to emit an alternating electromagnetic field. The induction charger may be provided as part of a base of the cup-shaped body or cradle.

The charging device may further comprise a control module, wherein the control module is configured to control the at least one radio frequency transmitter. The control module may be configured to control a/the induction charger. The charging device may further comprise a sensor (e.g. a proximity sensor), wherein the sensor is configured to detect a presence of an aerosol provision device in the aperture of the cup shaped body or cradle, and output a signal indicative of the presence of an aerosol provision device to the control module.

The at least one radio frequency transmitter may be configured to broadcast radio frequency signals towards a point within the internal aperture of the cup-shaped body or cradle.

The charging device may further comprise a fixing arrangement to retain the received aerosol provision device at a defined position within the internal aperture of the cup-shaped body or cradle.

The charging device may further comprise a magnetic levitation arrangement to bias the received aerosol provision device at a/the defined position within the internal aperture of the cup-shaped body or cradle.

BRIEF DESCRIPTION OF THE DRAWINGS

Example embodiments will now be described, by way of example only, with reference to the following schematic drawings, in which.

DETAILED DESCRIPTION

Figure 1:
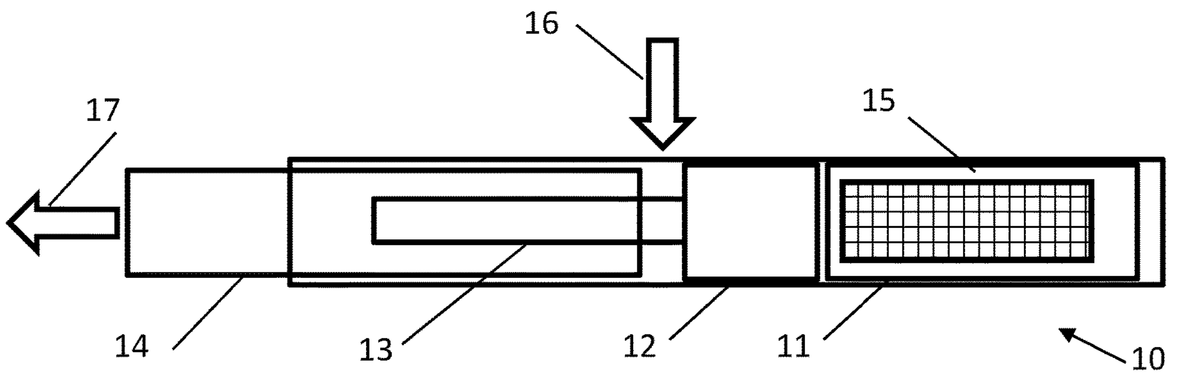
FIG. 1 is a block diagram of a non-combustible aerosol provision device in accordance with an example embodiment.

As used herein, the term "delivery system" is intended to encompass systems that deliver at least one substance to a user, and includes non-combustible aerosol provision systems that release compounds from an aerosol-generating material without combusting the aerosol-generating material, such as electronic cigarettes, tobacco heating products, and hybrid systems to generate aerosol using a combination of aerosol-generating materials.

According to the present disclosure, a "combustible" aerosol provision system is one where a constituent aerosol-generating material of the aerosol provision system (or component thereof) is combusted or burned during use in order to facilitate delivery of at least one substance to a user.

According to the present disclosure, a "non-combustible" aerosol provision system is one where a constituent aerosol-generating material of the aerosol provision system (or component thereof) is not combusted or burned in order to facilitate delivery of at least one substance to a user.

In some embodiments, the delivery system is a non-combustible aerosol provision system, such as a powered non-combustible aerosol provision system.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system comprises a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable for use with the non-combustible aerosol provision device.

In some embodiments, the disclosure relates to consumables comprising aerosol-generating material and configured to be used with non-combustible aerosol provision devices. These consumables are sometimes referred to as articles throughout the disclosure.

In some embodiments, the non-combustible aerosol provision system, such as a non-combustible aerosol provision device thereof, may comprise a power source and a controller. The power source may, for example, be an electric power source or an exothermic power source. In some embodiments, the exothermic power source comprises a carbon substrate which may be energised so as to distribute power in the form of heat to an aerosol-generating material or to a heat transfer material in proximity to the exothermic power source.

In some embodiments, the non-combustible aerosol provision system may comprise an area for receiving the consumable, an aerosol generator, an aerosol generation area, a housing, a mouthpiece, a filter and/or an aerosol-modifying agent.

In some embodiments, the consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

In some embodiments, the substance to be delivered may be an aerosol-generating material or a material that is not intended to be aerosolised. As appropriate, either material may comprise one or more active constituents, one or more flavours, one or more aerosol-former materials, and/or one or more other functional materials.

In some embodiments, the substance to be delivered comprises an active substance. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical. In one embodiment, the active substance is a legally permissible recreational drug. In some embodiments, the active substance comprises nicotine. In some embodiments, the active substance comprises caffeine, melatonin or vitamin B12. In some embodiments, the active substance comprises or is derived from one or more botanicals or constituents, derivatives or extracts thereof and the botanical is tobacco. In some embodiments, the substance to be delivered comprises a flavour.

Aerosol-generating material is a material that is capable of generating aerosol, for example when heated, irradiated or energized in any other way. Aerosol-generating material may, for example, be in the form of a solid, liquid or gel which may or may not contain an active substance and/or flavourants.

The aerosol-generating material may be an "amorphous solid". In some embodiments, the amorphous solid is a "monolithic solid". The aerosol-generating material may be non-fibrous or fibrous. In some embodiments, the aerosol-generating material may be a dried gel. The aerosol-generating material may be a solid material that may retain some fluid, such as liquid, within it. In some embodiments the retained fluid may be water (such as water absorbed from the surroundings of the aerosol-generating material) or the retained fluid may be solvent (such as when the aerosol-generating material is formed from a slurry). In some embodiments, the solvent may be water.

In some embodiments, the aerosol-generating material may for example comprise from about 50 wt %, 60 wt % or 70 wt % of amorphous solid, to about 90 wt %, 95 wt % or 100 wt % of amorphous solid.

The aerosol-generating material may comprise one or more active substances and/or flavours, one or more aerosol-former materials, and optionally one or more other functional material.

The aerosol-former material may comprise one or more constituents capable of forming an aerosol. In some embodiments, the aerosol-former material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The material may be present on or in a support, to form a substrate. The support may, for example, be or comprise paper, card, paperboard, cardboard, reconstituted material, a plastics material, a ceramic material, a composite material, glass, a metal, or a metal alloy. In some embodiments, the support comprises a susceptor. In some embodiments, the susceptor is embedded within the material. In some alternative embodiments, the susceptor is on one or either side of the material.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

FIG. 1 is a block diagram of a non-combustible aerosol provision device, indicated generally by the reference numeral 10, in accordance with an example embodiment.

The aerosol provision device 10 comprises a battery 11, a control circuit 12, a heater 13 and a consumable 14 (e.g. a tobacco consumable, for example in the form of a tobacco stick). The device also includes an antenna 15. As discussed in detail below, the antenna may be used to receive radio frequency signals for use in charging the battery 11 (e.g. under the control of the control circuit 12). In addition, the antenna 15 may be used to transmit and/or receive data, for example using one of a number of protocols (e.g. Bluetooth, Wi-Fi etc.). The example antenna 15 is shown provided near the battery 11; however, this is one of many example locations.

In the use of the device 10, the heater 13 is inserted into the consumable 14, such that the consumable may be heated to generate an aerosol (and tobacco flavour, in the case of a tobacco consumable) for the user. When a user inhales at the end of the consumable, as indicated by arrow 17, the air is drawn into the device 10, through an air inlet as indicated by arrow 16, then passes through the consumable, delivering the aerosol (and tobacco flavour, in the case of a tobacco consumable) to the user.

The aerosol provision device 10 is described by way of example only. Many alternative aerosol provision devices may be used in example implementations of the principles described here. For example, the device 10 may be replaced within a vaping device in which an aerosol generating material (e.g. a liquid) is heated to generate the aerosol. The principles of the present disclosure are not limited to a particular type of aerosol provision device 10 (that is to say, the aerosol provision device 10 may be arranged to aerosolise a solid, liquid or other aerosol-generating material via any suitable electrically powered or controller aerosol generator, such as a heater, a vibrating mesh, a source of irradiation, an electrically controller pressurised cannister which may include an electrically operated release valve, etc.).

Figure 2:
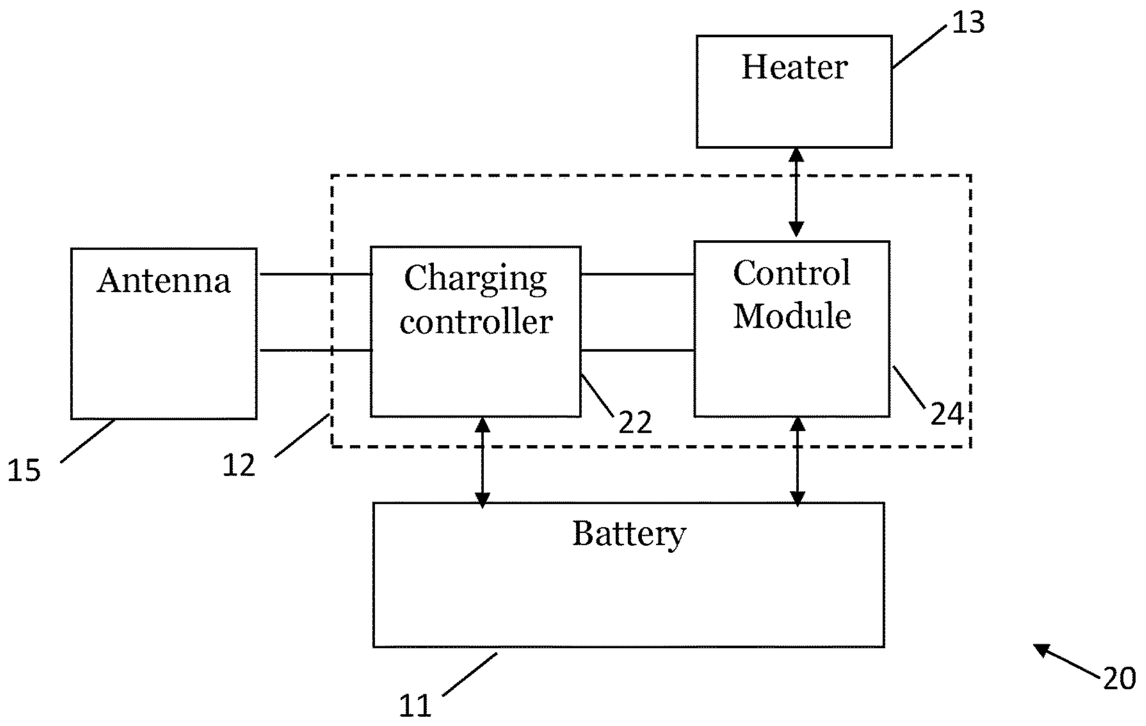
FIG. 2 is a block diagram of a system in accordance with an example embodiment.

FIG. 2 is a block diagram of a system, indicated generally by the reference numeral 20, in accordance with an example embodiment.

The system 20 comprises the battery 11, the control circuit 12, the heater 13 (or more generally, the aerosol generator) and the antenna 15 of the aerosol provision device 10 described above. The control circuit 12 of the system 20 comprises a charging controller 22 and a control module 24.

The antenna 15 may be used to receive radio frequency signals for use in charging the battery 11 (e.g. under the control of the control circuit 12). Furthermore, the charging controller 22 may be configured to charge the battery 11 (e.g. under the control of the control module 24) with power extracted from the received radio frequency signals.

It should be noted that, in some example embodiments, the functionality of the control module 24 is implemented by the charging controller 22. Indeed, the control module 24 may be omitted from some example embodiments.

Figure 3:
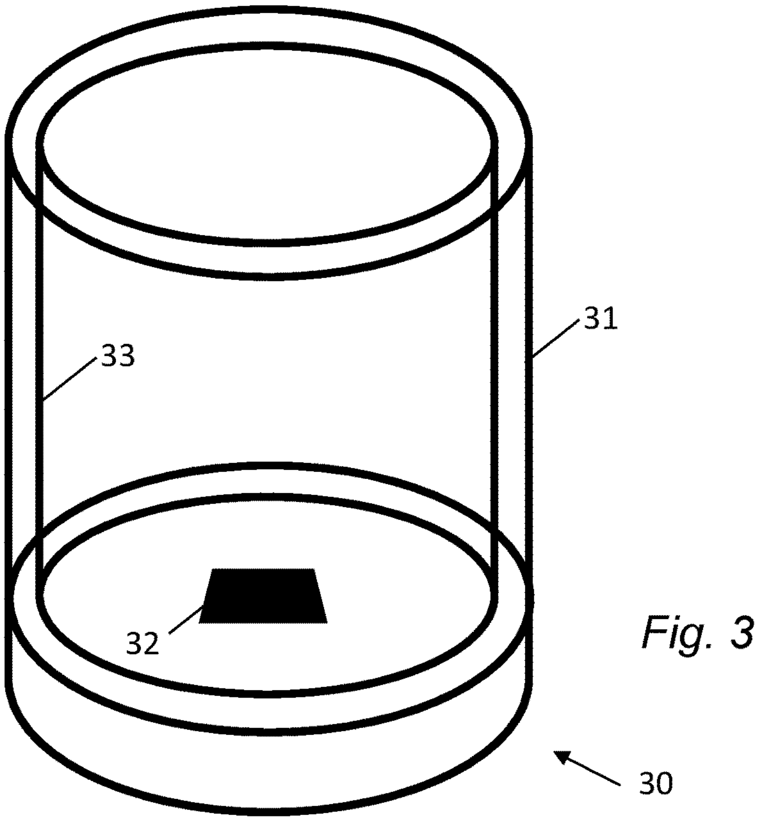
FIGS. 3 to 7 show charging devices in accordance with example embodiments.

FIG. 3 shows a charging device, indicated generally by the reference numeral 30, in accordance with an example embodiment.

The charging device 30 comprises a cup-shaped body or cradle 31 and at least one radio frequency transmitter 32. The cup shaped body 31 is configured to receive an aerosol provision device, such as the aerosol provision device 10. The at least one radio frequency transmitter 32 is configured to broadcast radio frequency signals into an internal aperture of the cup-shaped body or cradle 31. The broadcast radio frequency signals can then be received by an antenna (such as the antenna 15) and used for radio frequency charging.

A lining of the internal aperture 33 of the cup-shaped body or cradle 31 may comprise a material that reflects radio frequency signals. Thus, any radiofrequency signals incident on the internal aperture will be reflected, with a greater probability of successfully hitting an antenna of the aerosol provision device (e.g. the antenna 15) when the device is positioned in the internal aperture of the cup-shaped body or cradle 31. In some example embodiments, the lining of the internal aperture 33 is configured to reflect selected radio frequency signals.

The charging device 30 is shown with the at least one radio transmitter 32 positioned at a base of the cup-shaped body or cradle 31, such that the at least one radio transmitter 32 is configured to transmit radio frequency signals in a direction substantially along the longitudinal axis of the cup-shaped body or cradle 31. Radio waves that are transmitted off-axis may be reflected back towards the axis by the material that reflects radio frequency signals if provided as the lining of the internal aperture 33. Many other transmitter positions are possible, some of which are discussed further below.

The cup-shaped body or cradle 31 is shown having a cylindrical shape, but embodiments are not limited to this shape, and may include (but is not limited to) a rectangular prism or a triangular prism. The same is true for other cup-shaped bodies described below.

Figure 4:
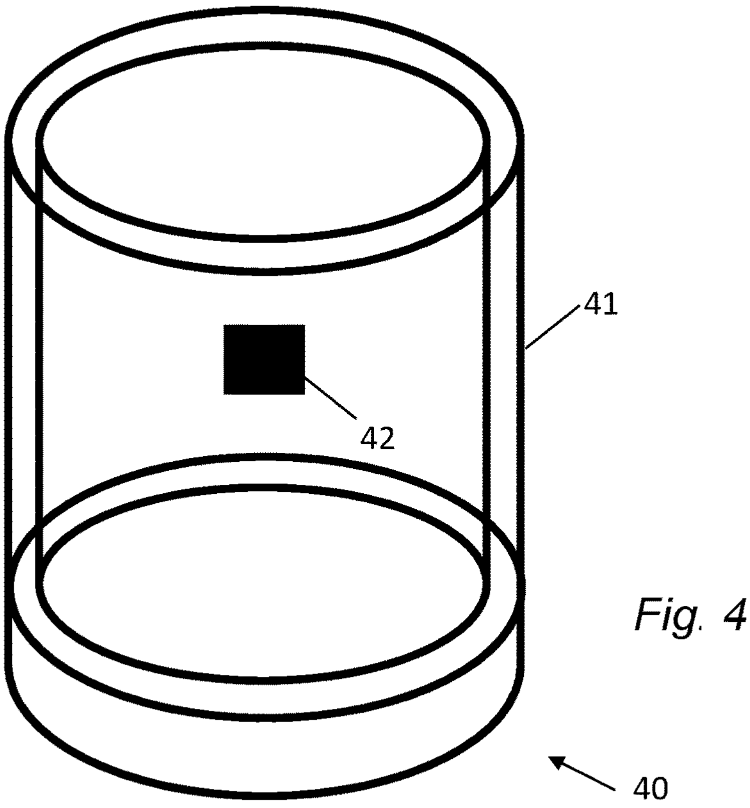

FIG. 4 shows a charging device, indicated generally by the reference numeral 40, in accordance with example embodiment.

The charging device 40 comprises a cup-shaped body or cradle 41 and at least one radio frequency transmitter 42. The cup shaped body 41 is configured to receive an aerosol provision device, such as the aerosol provision device 10. The at least one radio frequency transmitter 42 is configured to broadcast radio frequency signals into an internal aperture of the cup-shaped body or cradle 41.

The at least one radio transmitter 42 differs from the at least one radio transmitter 32 in that the transmitter 42 is positioned in the wall of the cup-shaped body or cradle along its longitudinal axis, such that the at least one radio transmitter 42 is configured to transmit radio frequency signals in a direction substantially along the radial axis of the cup-shaped body or cradle 41. Radio waves that are transmitted off-axis may be reflected back towards the axis by the material that reflects radio frequency signals if provided as the lining of the internal aperture. Of course, it would be possible to combine the radio transmitters 32 and 42 into a single cup-shaped body or cradle.

Figure 5:
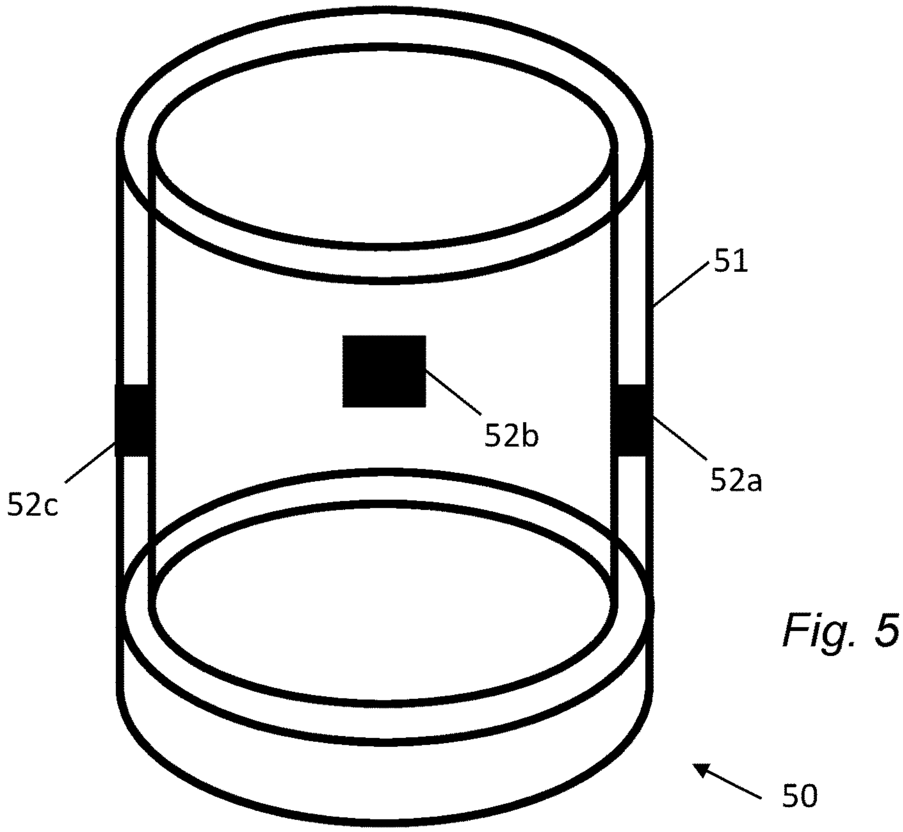

FIG. 5 shows a charging device, indicated generally by the reference numeral 50, in accordance with example embodiment.

The charging device 50 comprises a cup-shaped body or cradle 51 configured to receive an aerosol provision device and further comprising a plurality of radio transmitters 52*a*, 52*b*, 52*c*. The plurality of radio frequency transmitters 52*a* to 52*c* are arranged at different angular positions in the wall of the cup-shaped body or cradle 51. Of course, the arrangement shown in FIG. 5 is one of many example implementations. The plurality of radio frequency transmitters may be arranged at different points in the wall and/or the base of the cup-shaped body or cradle 51.

Figure 6:
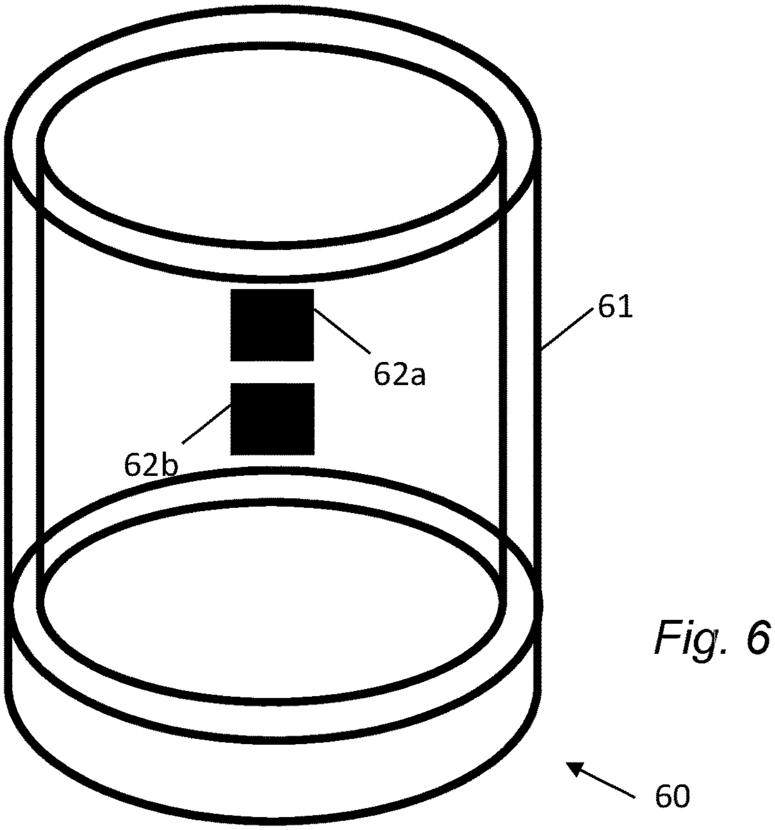

FIG. 6 shows a charging device, indicated generally by the reference numeral 60, in accordance with example embodiment.

The charging device 60 comprises a cup-shaped body or cradle 61 configured to receive an aerosol provision device and further comprising a plurality of radio transmitters 62*a* and 62*b*. The plurality of radio frequency transmitters 62*a*, 62*b* are arranged at different points in the wall along the longitudinal axis of the cup-shaped body or cradle 61.

Figure 7:
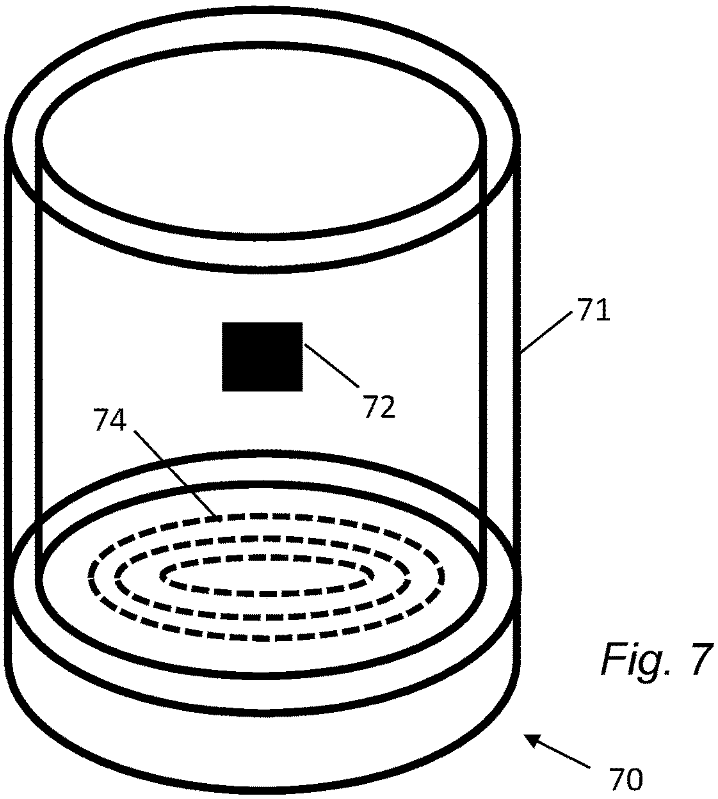

FIG. 7 shows a charging device, indicated generally by the reference numeral 70, in accordance with example embodiment.

The charging device 70 comprises at least one radio frequency transmitter 72. The charging device 70 further comprises an induction charger 74 configured to emit an alternating electromagnetic field. The induction charger 74 may be provided as part of a base of the cup-shaped body or cradle 71 (although alternative positions are possible). The induction charger 74 may comprise a coil coupled to an alternating power source such that an oscillating electromagnetic field is generated in the vicinity of the base of the cup-shaped body or cradle 71 of the charging device 70. Multiple radio frequency transmitters may be provided in the base and/or the wall of the charging device 70, for example as discussed above with reference to FIGS. 3 to 6.

Figure 8:
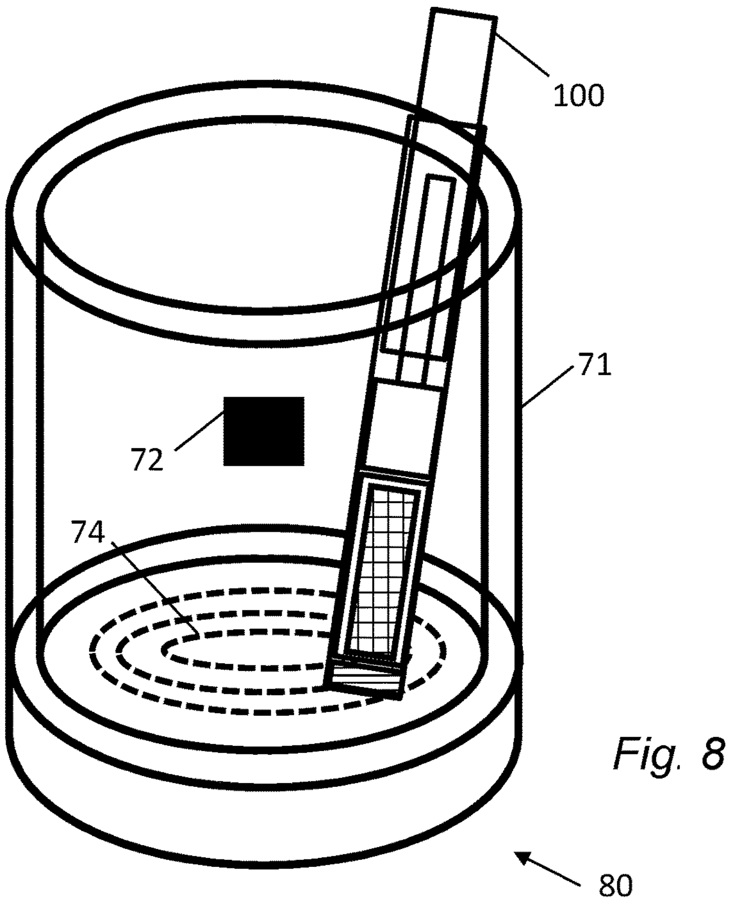
FIG. 8 shows a charging device including a device being charged in accordance with an example embodiment.

FIG. 8 shows a charging device, indicated generally by the reference numeral 80, including a device being charged 100.

The charging device 80 comprises the cup-shaped body or cradle 71, the at least one radio frequency transmitter 72 and the induction charger 74 described above. Positioned in the internal aperture of the cup-shaped body or cradle 71 is an aerosol provision device 100 for charging (which device is described further below). Of course, the aerosol provision device 100 could positioned in any of the charging devices 30, 40, 50 or 60 for radio frequency charging.

Figure 9:
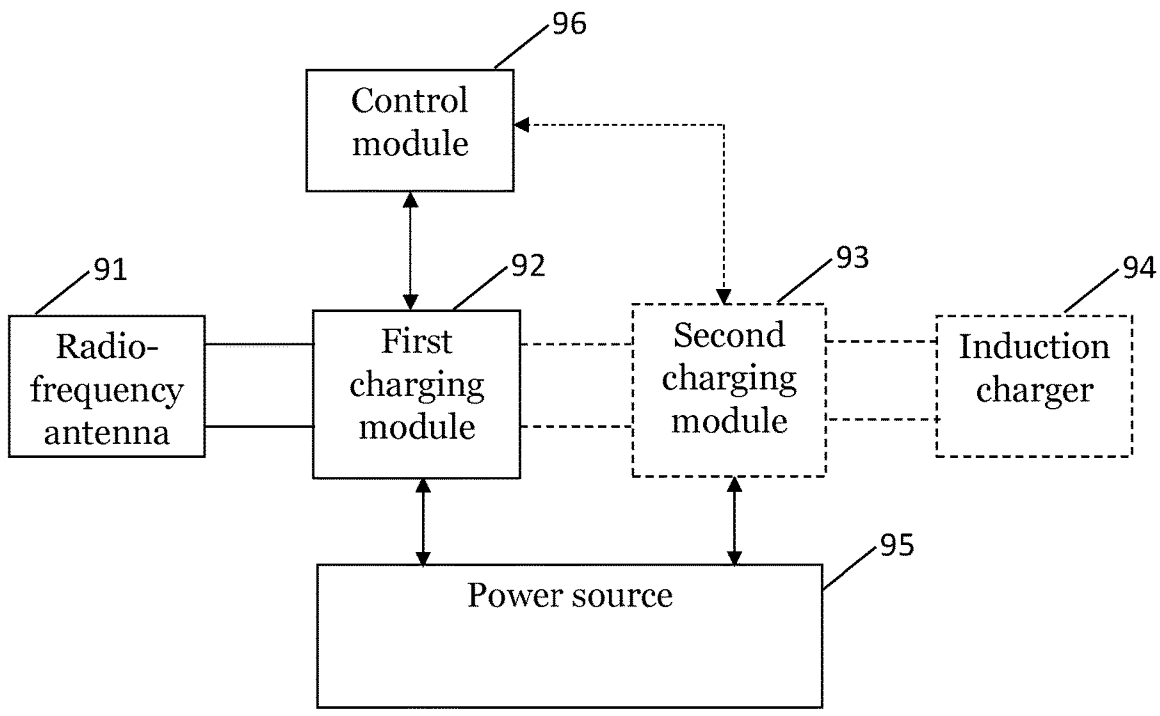
FIG. 9 is a block diagram of a system in accordance with an example embodiment.

FIG. 9 is a block diagram of a system, indicated generally by the reference numeral 90, in accordance with an example embodiment.

The system 90 comprises a radio frequency antenna 91, a first charging unit 92, a second charging unit 93, an induction charger 94, a power source 95 and a control module 96. The system 90 may be used to implement the charging device 70. In some example embodiments, the induction module 94 (and hence the second charging module 93) may be omitted (such that the system 90 may be used to implement any of the charging devices 30, 40, 50 or 60 described above, or the charging device 110 described below).

The control module 96 may be used to control the first charging module 92 so that so that radio frequency charging of a device (such as the device 100) using the radio frequency antenna 91 can be controlled. Alternatively, or in addition, if an induction charger 94 is provided, then the control module 96 may be used to control the second charging module 93 so that a induction charging of a device (such as the device 100) using the induction charger 94 can be controlled.

Figure 10:
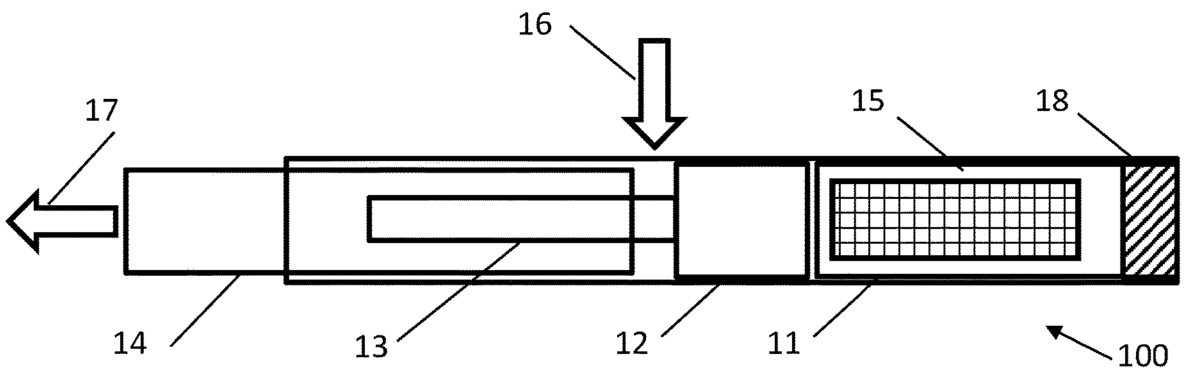
FIG. 10 is a block diagram of a non-combustible aerosol provision device in accordance with an example embodiment.

FIG. 10 is a block diagram of a non-combustible aerosol provision device, indicated generally by the reference numeral 100, in accordance with an example embodiment. The device 100 is the device that may be charged by the charging device 70 (as shown in FIG. 8) or, indeed, by any of the charging devices 30, 40, 50, 60 or 70 or variants thereof.

The aerosol provision device 100 comprises the battery 11, the control circuit 12, the heater 13, the consumable 14 and the antenna 15 of the aerosol provision device 10 described above. The aerosol provision device 100 differs from the device 10 by further comprising an induction module 18.

The induction module 18 is configured to electromagnetically couple to an induction charger (such as the induction chargers 74 or 94 described above) such that electrical power can be transferred from the charging device 70 to the aerosol provision device 100.

Figure 11:
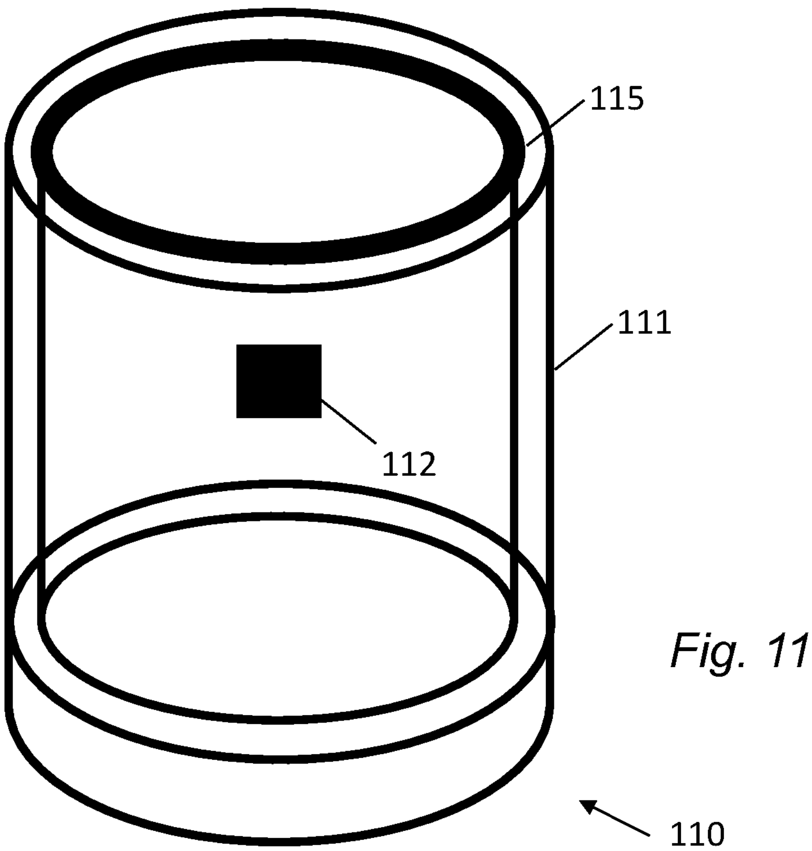
FIGS. 11 to 13 show charging devices in accordance with example embodiments.

FIG. 11 shows a charging device, indicated generally by the reference numeral 110, in accordance with an example embodiment. The charging device 110 comprises a cup-shaped body or cradle 111 and at least one radio frequency transmitter 112. The cup-shaped body or cradle 111 is configured to receive an aerosol provision device, as described above.

The charging device 110 comprises a sensor 115 (e.g. a proximity sensor). The sensor 115 is configured to detect the presence of an aerosol provision device in the aperture of the cup shaped body, and output a signal indicative of the presence of an aerosol provision device to a control module. The control module may control activation of the radio frequency transmitter 112 based on the output of the sensor 115. Of course, a similar sensor could be provided with any of the other charging devices described above. By way of example, the sensor 115 may comprise a wireless receiver configured to receive a wireless signal (such as a WiFi or Bluetooth) emitted by an aerosol provision device (e.g. for the purposes of establishing a communications link with the transmitter module 30).

Figure 12:
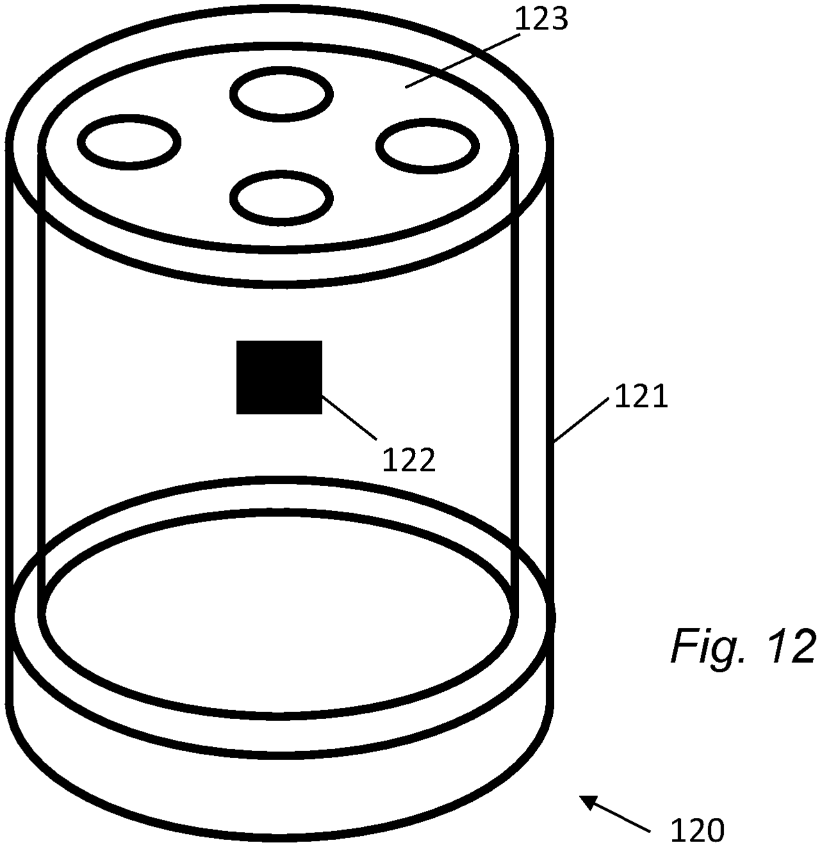

FIG. 12 shows a charging device, indicated generally by the reference numeral 120, in accordance with an example embodiment. The charging device 120 comprises a cup-sharped body or cradle 121 and at least one radio frequency transmitter 122. The at least one radio frequency transmitter 122 may be configured to broadcast radio frequency signals towards a point within the internal aperture of the cup-shaped body or cradle 121.

The charging device 120 may further comprise a fixing arrangement 123 to retain the received aerosol provision device at a defined position within the internal aperture of the cup-shaped body or cradle 121. The defined position may be aligned with the point within the internal aperture of the cup-shaped body or cradle 121 that the at least one radio frequency transmitter 122 is configured to broadcast radio frequency signals towards.

In this embodiment, the fixing arrangement 123 may comprise a lid including at least one aperture configured to receive the aerosol provision device such that the aerosol provision device is disposed at the defined position. Of course, many other fixing arrangements, such as the use of brackets, will be readily apparent to the skilled person.

Figure 13:
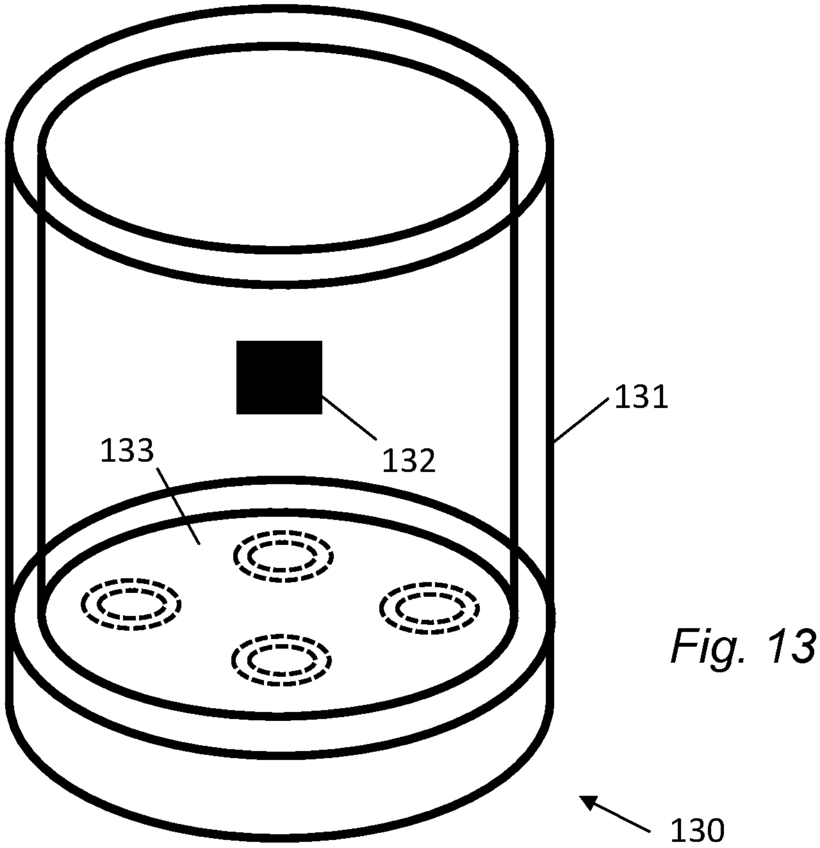

FIG. 13 shows a charging device, indicated generally by reference numeral 130, in accordance with an example embodiment. The charging device 130 comprises a cup-sharped body or cradle 131 and at least one radio frequency transmitter 132. The at least one radio frequency transmitter 132 may be configured to broadcast radio frequency signals towards a point within the internal aperture of the cup-shaped body or cradle 131.

The charging device 130 may further comprise a magnetic levitation arrangement 133 to bias the received aerosol provision device at a/the defined position within the internal aperture of the cup-shaped body or cradle 131. The magnetic levitation arrangement may comprise at least one magnet disposed in the cup-shaped body or cradle. The at least one magnet may be an electro-magnet, a temporary magnet and/or a permanent magnet.

In some implementations of at least some of the example embodiments described above, the at least one radio transmitter (such as the transmitter 32, 42, 52, 62, 72, 91 and 112) may be configured to broadcast radio frequency signals towards a point (e.g. a central point) within the internal aperture of the respective cup-shaped body or cradle.

As discussed above, electrical power may be extracted (e.g. by an aerosol provision device) from radio frequency (RF) signals. This may be implemented in a number of ways. For example, a receiving antenna may be provided to receive the RF signals, causing a potential difference to occur across the length of the antenna. Thus, an AC (typically sinusoidal) RF signal is obtained at the antenna. This AC signal is typically converted into a DC signal, for example using a rectifier circuit (such as a full bridge or half-bridge rectifier circuit). In some example embodiments, an impedance matching circuit is provided between the antenna and a rectifier circuit that seeks to maximise power transfer from the antenna to the rectifier. The DC electrical power output by the rectifier may, for example, be stored using a battery.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A charging device comprising:

a cup-shaped body or cradle configured to receive an aerosol provision device;

at least one radio frequency transmitter configured to broadcast radio frequency signals into an internal aperture of the cup-shaped body or cradle, wherein the at least one radio transmitter is positioned in a wall of the cup-shaped body or cradle along its longitudinal axis, and wherein a lining of the internal aperture of the cup-shaped body or cradle comprises a material that reflects selected radio frequency signals;

an induction charger, configured to emit an alternating electromagnetic field, wherein the induction charger is provided as part of a base of the cup-shaped body or cradle;

a control module, wherein the control module is configured to control the at least one radio frequency transmitter and the induction charger; and a sensor, wherein the sensor is configured to detect a presence of the aerosol provision device in the internal aperture of the cup shaped body or cradle, and output a signal indicative of the presence of the aerosol provision device to the control module for the control module to control both the at least one radio frequency transmitter and the induction charger.

2. The charging device as claimed in claim 1, wherein another one of the at least one radio transmitter is positioned in a base of the cup-shaped body or cradle.

3. The charging device as claimed in claim 1, wherein the at least one radio frequency transmitter comprises a plurality of radio frequency transmitters.

4. The charging device as claimed in claim 3, wherein the plurality of radio frequency transmitters are arranged at different points in the wall along the longitudinal axis of the cup-shaped body or cradle.

5. The charging device as claimed in claim 3, wherein the plurality of radio frequency transmitters are arranged at different angular positions in the wall of the cup-shaped body or cradle.

6. The charging device as claimed in claim 1, wherein the sensor is a proximity sensor.

7. The charging device as claimed in claim 1, wherein the at least one radio frequency transmitter is configured to broadcast the radio frequency signals towards a point within the internal aperture of the cup-shaped body or cradle.

8. The charging device as claimed in claim 1, further comprising:

a fixing arrangement to retain the received aerosol provision device at a defined position within the internal aperture of the cup-shaped body or cradle.

9. The charging device as claimed in claim 1, further comprising:

a magnetic levitation arrangement to bias the received aerosol provision device at a defined position within the internal aperture of the cup-shaped body or cradle.

* * * * *